United States Patent

Meyer

[19]

[11] Patent Number: 5,819,591
[45] Date of Patent: Oct. 13, 1998

[54] SHIFTING DEVICE FOR AN AUTOMATIC TRANSMISSION OF A MOTOR VEHICLE

[75] Inventor: Jörg Meyer, Wagenfeld, Germany

[73] Assignee: Lemförder Metallwaren AG, Stemwede-Dielingen, Germany

[21] Appl. No.: 781,912

[22] Filed: Dec. 30, 1996

[30] Foreign Application Priority Data

Jan. 10, 1996 [DE] Germany ................ 196 00 526.4

[51] Int. Cl.⁶ .............. F16H 59/04; F16H 59/02; F16H 63/38
[52] U.S. Cl. ................. 74/473.18; 74/473.28; 74/524
[58] Field of Search ............... 74/335, 473 R, 74/475, 524, 473.18, 473.28

[56] References Cited

U.S. PATENT DOCUMENTS

| | | | |
|---|---|---|---|
| 1,743,241 | 1/1930 | Schmidt | 74/473 P X |
| 5,127,288 | 7/1992 | Hojo et al. | 74/335 |
| 5,509,322 | 4/1996 | Anderson et al. | 74/335 |
| 5,680,307 | 10/1997 | Issa et al. | 74/335 X |
| 5,689,996 | 11/1997 | Ersoy | 74/335 |

FOREIGN PATENT DOCUMENTS

| | | |
|---|---|---|
| 39 27 250 C2 | 6/1991 | Germany . |
| 42 17 773 A1 | 12/1993 | Germany . |
| 44 26 207 C1 | 8/1995 | Germany . |
| 195 26 059 A1 | 1/1997 | Germany . |

Primary Examiner—Allan D. Herrmann
Attorney, Agent, or Firm—McGlew and Tuttle

[57] ABSTRACT

A shifting device for an automatic transmission of a motor vehicle has a first automatic shifting gate and a second, step-by-step shifting gate. A two-part selector lever is provided including a selector lever upper part and a selector lever lower part accommodating same. The selector lever is mounted rotatably in each of the two shifting gates via a separate shifting axis. The connection between the selector lever upper part and the selector lever lower part is engaged or disengaged by changing from one shifting gate to the other.

11 Claims, 5 Drawing Sheets

SHIFTING DEVICE FOR AN AUTOMATIC TRANSMISSION OF A MOTOR VEHICLE

FIELD OF THE INVENTION

The present invention pertains to a shifting device for an automatic transmission of a motor vehicle with a first automatic shifting gate and a second shifting gate for a manual, step-by-step shifting operation (step-by-step shifting gate), and with a selector lever mounted pivotably within a gear shifting gate around a selector axis located under the said gear shifting gate, wherein the selector axis is mounted in a housing that accommodates the shifting device and is rigidly attached to the vehicle body, and a first, lower shifting axis is located at right angles to the selector axis and in one plane with it.

BACKGROUND OF THE INVENTION

A selection means for an automatic transmission of a motor vehicle, in which the selector lever can be pivoted to and fro between two different shifting gates, has been known from DE 44 26 207. The first shifting gate makes possible the automatic operation, and the second shifting gate makes possible a manual, step-by-step shifting. To make it possible to design this shifting mechanism as compactly as possible, the selector axis and the shifting axis of the selector level are placed into a common plane. Furthermore, the two axes are arranged at right angles to one another. The selector lever is pivoted into the step-by-step shifting gate for changing over from automatic operation to manual operation. It now engages guide elements of a complementary design, which receive and pass on the signals of the manual shifting operation. This shifting mechanism is complicated and consequently expensive in terms of both design and manufacturing technology as a consequence of a large number of components.

DE 195 26 059 discloses a shifting mechanism for an automatic transmission of a motor vehicle, in which a selector lever within a gear shifting gate is pivotable around a selector axis located deeper than the said gear shifting gate and is held in the shift positions P, R, N and D by spring force acting at right angles to the longitudinal direction of the gear shifting gate against lock-in positions laterally offset in relation to one another, which are associated with the shift positions. The selector axis of the selector lever is mounted in an intermediate part by means of a universal joint. In contrast, the intermediate part is mounted pivotably around the selector axis on a housing that is a rigid part of the vehicle body. In the secondary shift position (M) for step-by-step manual shifting, compared with the shift position (D) associated with automatic shifting, the selector lever is pivoted manually relative to the intermediate part for the step-by-step selection of the gears of the transmission in the direction of the selection movement to bridge over shift contacts around a drag bearing located higher than the selector axis. The upper drag bearing is formed by a pin provided laterally on the selector lever. This form of bearing has the drawback that the force introduced via the selector lever during the step-by-step shifting generates a torque in the mounting point and undesired relative movements cannot thus be ruled out. In the shift positions P, R, N and D of the selector lever, the latter engages holding elements. The holding elements are connected in one piece to the intermediate part. Due to the engagement of the selector lever with the holding elements, the intermediate part is also pivoted around the transverse axis together with the selector lever at the time of the shifting of the gears. Such an embodiment of an automatic shifting of a motor vehicle transmission is expensive as a consequence of the large number of components. The manufacturing tolerances must be compensated by complicated design measures.

SUMMARY AND OBJECTS OF THE INVENTION

The object of the present invention is to provide a shifting device for an automatic transmission of a motor vehicle, which has a second step-by-step shifting gate for a manual, step-by-step shifting operation, besides a first, automatic shifting gate. Such a shifting device shall be able to be manufactured with a small number of individual parts in a simple and inexpensive manner.

A shifting device for an automatic transmission of a motor vehicle with a first automatic shifting gate and a second shifting gate for a manual, step-by-step shifting operation (step-by-step shifting gate). A selector lever is mounted pivotably within a gear shifting gate around a selector axis located under the gear shifting gate. The selector axis is mounted in a housing that accommodates the shifting device and is rigidly attached to the vehicle body. A first, lower shifting axis is located at right angles to the selector axis and in one plane with it. The selector lever 1 is a two-part lever, and there is a connection between the selector lever upper part 1.1 and the selector lever lower part accommodating same in the automatic shifting gate. The connection is disengaged by pivoting the selector lever into the step-by-step shifting gate.

The connection between the selector lever upper part and the selector lever lower part may be a positive-locking connection. The connection between the selector lever upper part and the selector lever lower part may also be elastic.

The connection between the selector lever upper part and the selector lever lower part of the selector lever in the automatic shifting gate preferably comprises a piston rod with two pistons elements, which engage complementary recesses of the corresponding parts of the said selector lever. The pistons are preferably mounted on the piston rod. The pistons and the piston rod are preferably made of one part.

The selector lever upper part of the selector lever is preferably mounted in the step-by-step shifting gate in the selector lever lower part pivotably around a second shifting axis. The shifting axis is mounted in one piece in the housing that is rigidly attached to the vehicle body.

A spring element preferably positions the selector lever upper part in the step-by-step shifting gate in relation to the selector lever lower part. A locking means preferably simulates the step-by-step shifting process in the step-by-step shifting gate. The connection between the shifting device and the gearbox in the automatic shifting gate is preferably established by a coupling member on the selector lever lower part.

Ever-increasing requirements are also imposed on shifting devices for automatic transmissions in terms of convenience of operation. There has therefore been an increasing change toward additionally providing manual shifting functions, besides the conventional automatic shifting functions. A second, separate shifting gate is necessary for this in the shifting device. The selection of this shifting gate makes it possible for the driver of the vehicle to shift the transmission step by step in a simple manner. To change over from the conventional automatic shifting operation into the step-by-step shifting gate, it is necessary to mount the selector lever pivotably via a selector axis. Furthermore, it is necessary to fix the selector lever in the step-by-step shifting gate. A shifting device according to the present invention for an automatic transmission of a motor vehicle has a selector lever on the top side of which, which faces the driver of the vehicle, a shifting knob is located.

The selector lever comprises a selector lever upper part and a selector lever lower part accommodating the former. It is mounted pivotably around a selector axis in a housing that is rigidly connected to the vehicle body. The selector lever upper part is connected to the selector lever lower part. This connection is engaged during automatic shifting operation. The connection between the selector lever upper part and the selector lever lower part is abolished by pivoting the selector lever around the selector axis, from the automatic shifting gate into the step-by-step shifting gate.

A connection piece, which is disengaged during the pivoting movement, is used for this purpose. This connection piece passes through both parts of the selector lever in a positive-locking manner. A spring element, which acts against the connection piece, ensures that the connection between the two parts of the selector level is restored during the resetting movement from the step-by-step shifting gate into the automatic shifting gate. A coupling member connection of the shifting device to the automatic transmission of the motor vehicle is located on the selector lever lower part. As long as the selector lever is in the automatic shifting gate, the connection between the selector lever lower part and the selector lever upper part is present, so that the entire selector lever is pivoted around a first, lower shifting axis in order to thus select the automatic shifting gears of the transmission. To perform a changeover from the automatic shifting gate into the step-by-step shifting gate, the selector lever is pivoted to the side around the selector axis mounted in the housing that is rigidly connected to the vehicle body. The connection between the selector lever upper part and the selector lever lower part is now disengaged. A first locking means, which acts on the selector lever in a spring-elastic manner when the said selector lever is turned over, so that the selector lever is fixed by the locking means in its position in one of the two shifting gates after overcoming a "top dead center," is provided according to the present invention. The selector lever is thus held in an elastic manner in this laterally pivoted position. The gearshift processes can be preset by the driver of the vehicle manually in the step-by-step shifting gate. Only the selector lever upper part is pivoted around a second, upper shifting axis for this purpose. This shifting axis is introduced during pivoting into a complementary recess of the housing rigidly attached to the vehicle body, and it thus also acts as a pivot axis for the selector lever upper part at the same time. The step-by-step shifting is performed by briefly pushing the selector lever in the corresponding direction. The selector lever upper part is positioned in relation to the selector lever lower part by pretensioning with a spring.

To simulate the shifting process in the step-by-step shifting gate, a second locking means is provided on the selector lever upper part. This locking means generates a spring force opposite the direction of movement of the selector lever. It additionally pushes the selector lever back into its starting position within the step-by-step shifting gate, but it shall not represent a true locking, as in the case of the first locking means. The two locking means have an identical design.

One exemplary embodiment will be explained in greater detail below with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
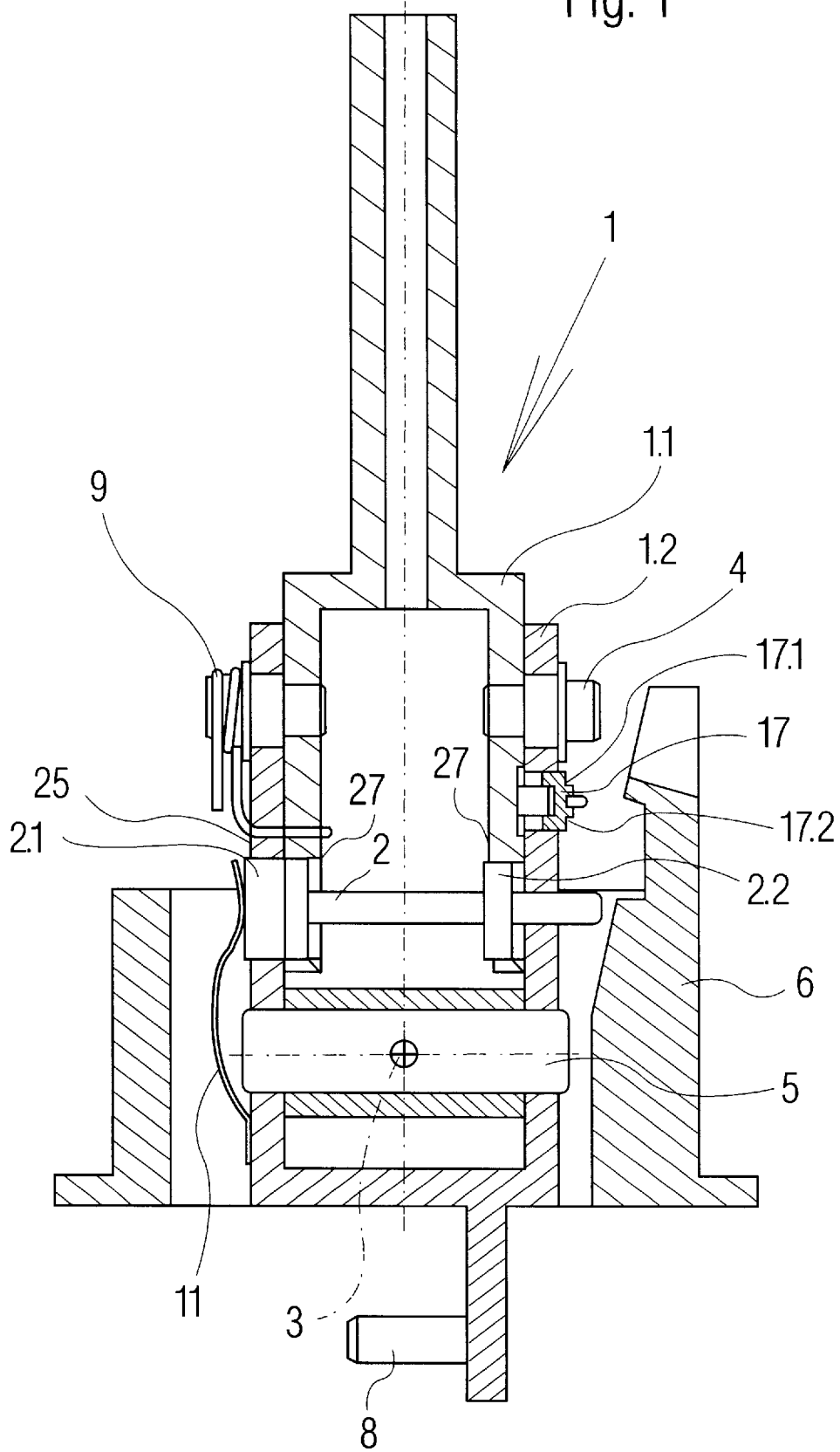
FIG. 1 is a sectional view of a shifting device according to the present invention for an automatic transmission, in which the selector lever is in the automatic shifting gate.
Figure 5:
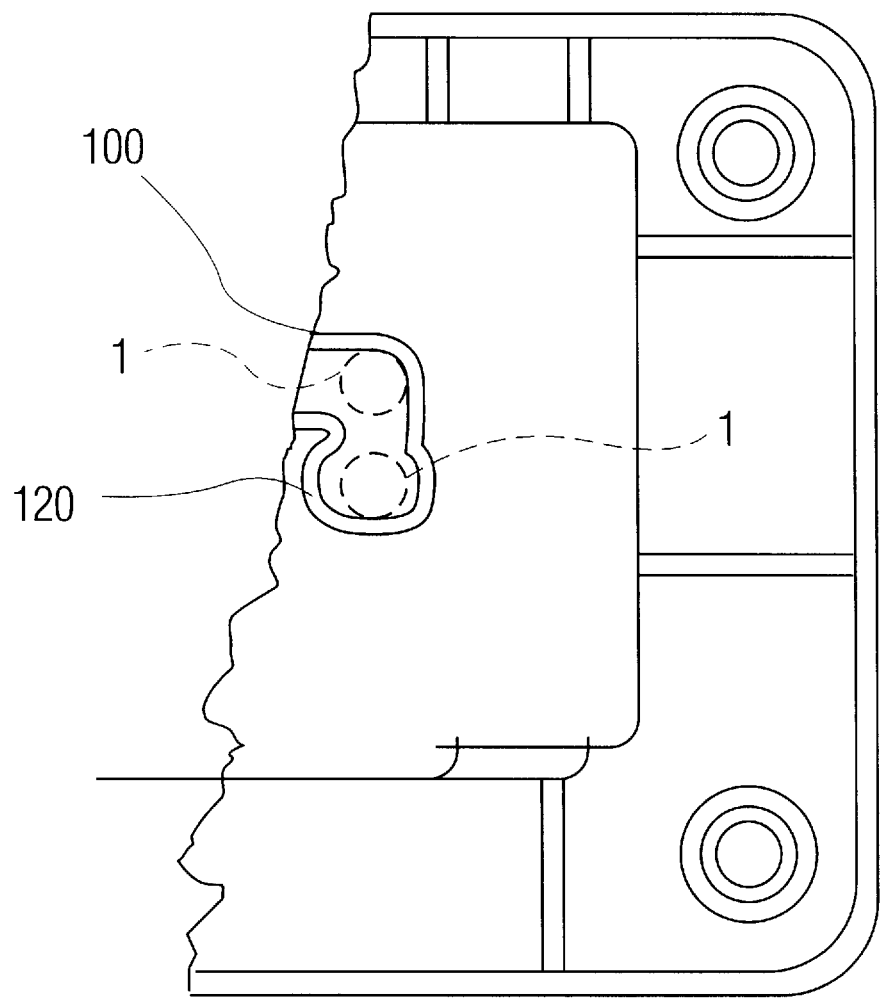
FIG. 5 is a top view of the gear shifting gate and step-by-step shifting gate.

Referring to the drawings in particular, the invention provides a shifting device as shown in FIG. 1 for an automatic transmission. This represents an inexpensive variant that can be manufactured in an especially simple manner. The selector lever 1 comprises a selector lever upper part 1.1 and a selector lever lower part 1.2 accommodating the selector lever upper part. The selector lever is guided by a gear shifting gate 100 shown in FIG. 5. Under the gear shifting gate 100, the selector lever upper part has two legs arranged symmetrically to the center line of the selector lever in the embodiment shown. The outer surfaces of the selector lever upper part are slidingly in contact with the inner surfaces of the selector lever lower part.

A piston rod 2 with two pistons 2.1, 2.2, which are arranged similarly to a two-stage piston of a multistage compressor, is used to connect the selector lever upper part to the selector lever lower part. The pistons of the piston rod are advantageously conical at least in some areas. They engage complementary recess 25 of the selector lever upper part as well as complimentary recesses 27 of the selector lever lower part. The elastic connection between the piston rod and the selector lever upper part or the selector lever lower part is brought about by a leaf spring 11 in the exemplary embodiment shown. This leaf spring 11 is fastened on one side to the selector lever lower part. It acts against the piston 2.1.

The position of the selector lever shown in FIG. 1 in the automatic shifting gate makes it possible to pivot the entire selector lever 1 around the lower shifting axis member 5 as it moves in bearing sleeve 12. A coupling member 8 on the selector lever lower part is used to connect the shifting device to the automatic transmission.

Figure 2:
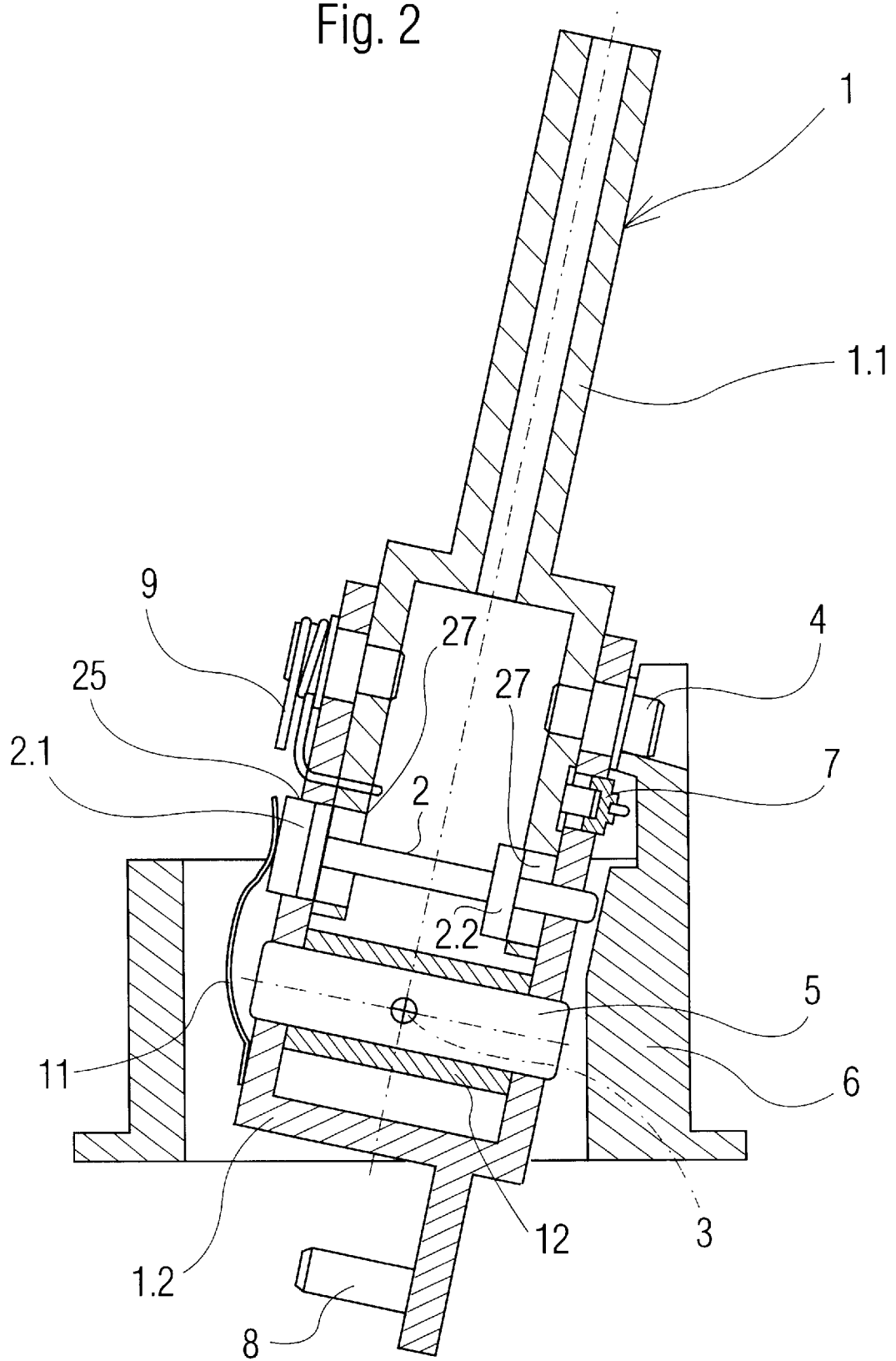
FIG. 2 is a sectional view of a shifting device for an automatic transmission, in which the selector lever is in the step-by-step shifting gate.
Figure 3:
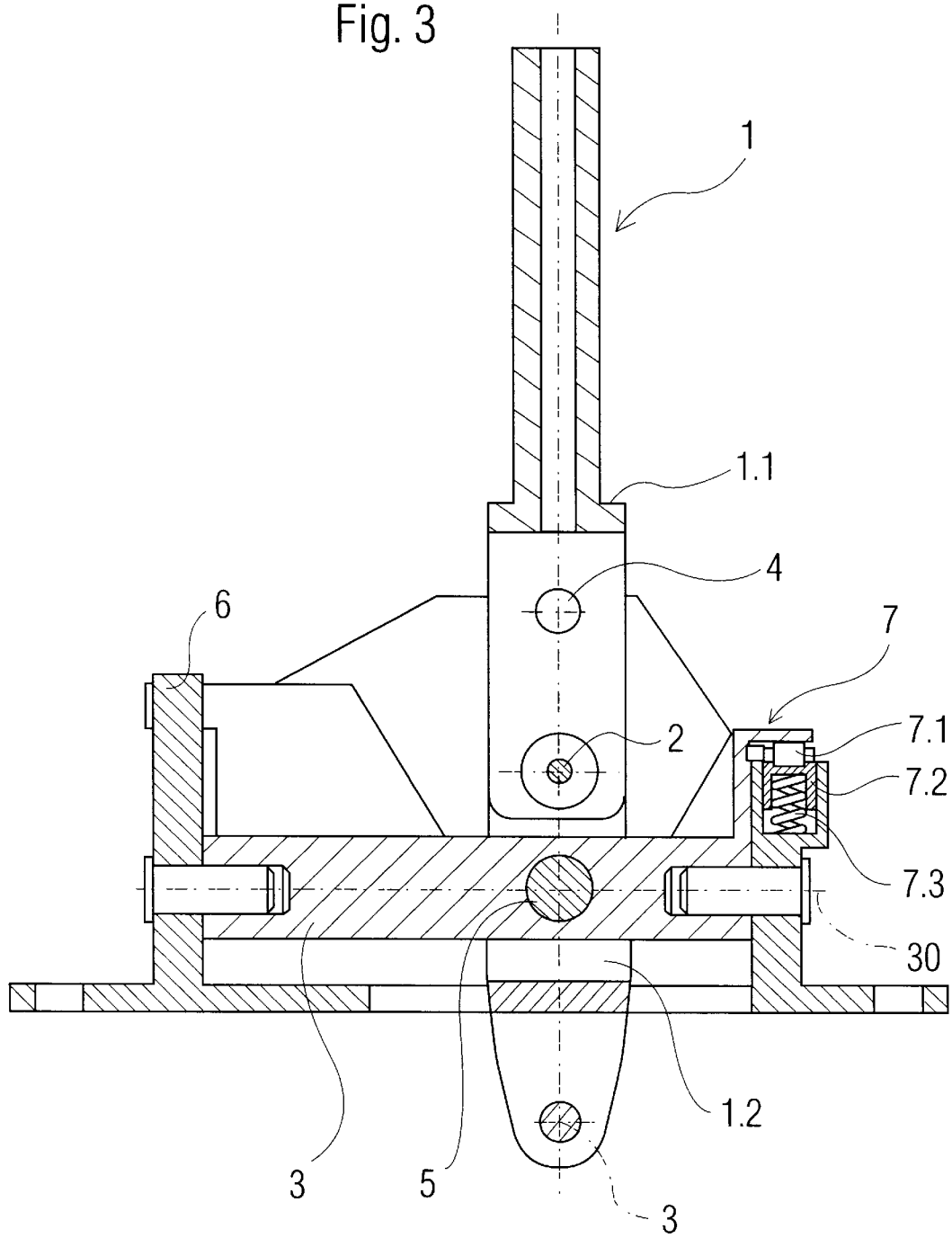
FIG. 3 is a sectional view of a shifting device according to the present invention for an automatic transmission of a motor vehicle as a side view.

The position of the selector lever 1 for step-by-step in the step-by-step shifting gate is shown in FIG. 2. To change from one shifting gate to the other, the selector lever is pivoted laterally around the selector axis member 3 mounted in the housing 6 that is rigidly connected to the vehicle body. The upper shifting axis 4 now engages a complementary recess in the housing 6 rigidly attached to the vehicle body. This recess of the housing is used as a support for the shifting axis and at the same time as a mounting point for the selector lever in this shifting gate. The piston rod 2 with the pistons 2.1, 2.2 located on it between the selector lever upper part and the selector lever lower part is disengaged during the changeover from one shifting gate to the other. The part of the piston rod passing through the selector lever lower part is displaced by a contact surface in the housing of the shifting device in the axial direction, against the direction of movement of the selector lever 1. The selector lever upper part 1.1 is pivotable in the selector lever lower part 1.2 around the upper shifting axis 4 in this pivoted position of the selector lever. The positioning of the selector lever 1 in this oblique position is also made possible by an elastic, first locking means 7. The shifting movement of the selector lever upper part 1—1 is counteracted by a spring element 9, which positions the selector lever lower part 1,2 in relation to the selector lever upper part 1—1. The selector lever upper part 1—1 is thus returned into its starting position after the shifting up or down of a gear by the driver of the vehicle. A second locking means 17 on the selector lever upper part is used to simulate a step-by-step shifting process. This second locking means 17 has the same design as the first locking means 7, only its dimensions are different. The second locking means 17 comprises a roller 17.1 and a spring cage 17.2 which accommodates a coil spring. FIG. 3 shows a sectional view of a shifting device for an automatic transmission; this view is rotated by 90° compared with the representation shown in FIG. 1. The two-part selector lever, comprising the selector lever upper part 1.1 and the selector lever lower part 1.2, is rotatably mounted on a selector axis 3 member for rotation about selector axis 30. Simple bolt connections may be selected as the mounting elements. FIG. 3 also shows the first locking means 7. As is used for moving the selector lever 1 around the axis member 3, to position it in a step-by-step shifting position. The locking means comprises a roller 7.1 and a spring cage 7.2, which accommodates a coil spring 7.3 for elastically guiding the roller.

The roller is elastically pressed against a lever arm 19 of the selector axis body 3. When the selector lever is pivoted around the selector axis body 3, a feeling of shifting is thus communicated to the driver of the vehicle, because he is able to feel a clearly discernible locking.

The locking means 7 is used to fix the selector lever in a defined position and locking means 17 to simulate a shifting process in the form of a travel limitation.

Figure 4:
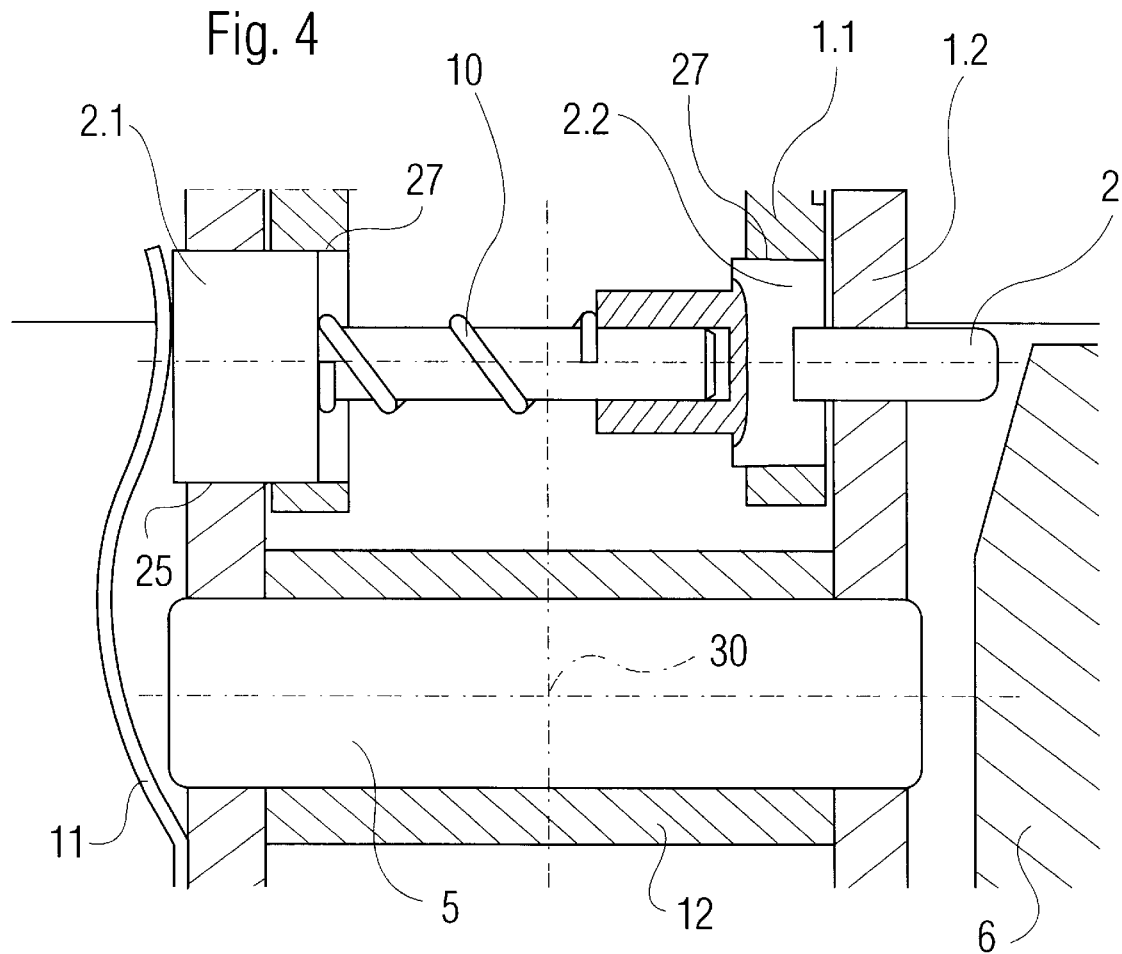
FIG. 4 is a partial sectional view of the connection between the selector lever upper part and the selector lever lower part according to a further embodiment.

The connection between the selector lever upper part 1.1 and the selector lever lower part 1.2 is shown once again in FIG. 4. The piston rod 2 is made in one piece (made as one part) with the piston 2.1 in the embodiment shown in this figure. The piston 2.2 accommodates the piston rod 2 in a mount. A coil spring 10 is supported between the two pistons. This special design of the connection of the two parts of the selector lever is used to compensate clearance. It can thus be guaranteed that the connection is always a positive-locking one, and the pistons uniformly engage the parts of the selector lever. The coil spring 10 cooperates with the leaf spring 11 in a reinforcing manner if the selector lever is in the automatic shifting gate.

While a specific embodiment of the invention has been shown and described in detail to illustrate the application of the principles of the invention, it will be understood that the invention may be embodied otherwise without departing from such principles.

List of Reference Numbers

1 Selector lever
1.1 Selector lever upper part
1.2 Selector lever lower part
2 Piston rod
2.1 First piston
2.2 Second piston
3 Selector axis
4 Upper shifting axis
5 Lower shifting axis
6 Housing
7 Locking means
7.1 Roller
7.2 Spring cage
7.3 Coil spring
8 Coupling member
9 Spring element
10 Coil spring
11 Leaf spring

What is claimed is:

1. A shifting device for an automatic transmission of a motor vehicle, comprising:

a housing rigidly attached to the vehicle body;

a selector axis member with a selector axis;

a lower shifting axis member and a selector lever including:

a selector lever upper part, a selector lever lower part, said selector lever lower part being mounted in said housing, said selector lever being pivotable about said selector axis member, said selector axis member being mounted in said housing, said lower shifting axis member being located at right angles to the selector axis and in one plane with said selector axis members and connection means connecting said selector lever upper part and a selector lever lower part, whereby a connection between said selector lever upper part and a selector lever lower part is disengaged by pivoting said selector lever about said selector axis into a step-by-step shifting area.

2. A shifting device for an automatic transmission of a motor vehicle in accordance with claim 1, wherein said connection means includes a positive-locking connection.

3. A shifting device for an automatic transmission of a motor vehicle in accordance with claim 1, wherein said connection means provides an elastic connection.

4. A shifting device for an automatic transmission of a motor vehicle in accordance with claim 1 wherein said connection means comprises a piston rod with two pistons, which engage complementary recesses of the corresponding parts of said selector lever.

5. A shifting device for an automatic transmission of a motor vehicle in accordance with claim 4, wherein said pistons are mounted on said piston rod.

6. A shifting device for an automatic transmission of a motor vehicle in accordance with claim 4, wherein said pistons and said piston rod are made of one part.

7. A shifting device for an automatic transmission of a motor vehicle in accordance with claim 1, wherein said selector lever upper part is mounted in said step-by-step shifting gate in said selector lever lower part pivotably around another shifting axis said another shifting axis is mounted in one piece in said housing.

8. A shifting device in accordance with claim 1, further comprising: a spring means for positioning said selector lever upper part in said step-by-step shifting gate in relation to said selector lever lower part.

9. A shifting device in accordance with claim 1, further comprising locking means for simulating the step-by-step shifting process in said step-by-step shifting gate.

10. A shifting device in accordance with claim 1, wherein said connection means includes a coupling member on said selector lever lower part.

11. A shifting device for an automatic transmission of a motor vehicle, comprising:

a housing rigidly attached to the vehicle body;

a selector axis member having a selector axis;

a lower shifting axis member having a lower shifting axis; and a selector lever pivotable with respect to said lower shifting axis for automatic shifting, said selector lever including a selector lever upper part, a selector lever lower part, said selector lever lower part being connected to said housing via said lower shifting axis member and said selector axis member, said selector axis member being mounted in said housing, said lower shifting axis member being located at right angles to the selector axis and said lower shifting axis being in one plane with said selector axis, and connection means connecting said selector lever upper part and a selector lever lower part, whereby a connection between said selector lever upper part and a selector lever lower part is disengaged by pivoting said selector lever about said selector axis into a step-by-step shifting area.

\* \* \* \* \*